United States Patent

[11] 3,581,121

[72] Inventor John Thomas Lawrence Sharpe
Harlow, Essex, England
[21] Appl. No. 810,631
[22] Filed Mar. 26, 1969
[45] Patented May 25, 1971
[73] Assignee International Standard Electric Corporation
New York, N.Y.
[32] Priority Apr. 16, 1968
[33] Great Britain
[31] 17808/68

[54] DELAY LINE ARRANGEMENT
3 Claims, 4 Drawing Figs.

[52] U.S. Cl. .......... 307/293, 307/221, 328/37, 328/67, 328/97, 328/106
[51] Int. Cl. .......... H03k 17/28
[50] Field of Search .......... 307/221, 293; 328/37, 67, 97, 106

[56] References Cited
UNITED STATES PATENTS

| | | | |
|---|---|---|---|
| 2,861,216 | 11/1958 | England .......... | 328/37X |
| 2,906,890 | 9/1959 | Odell et al. .......... | 307/221 |
| 3,082,332 | 3/1963 | Smeltzer et al. .......... | 307/221X |
| 3,252,009 | 5/1966 | Weimer .......... | 307/221 |
| 3,289,010 | 11/1966 | Bacon et al. .......... | 307/221 |
| 3,402,355 | 9/1968 | Hannan et al. .......... | 307/293X |
| 3,471,711 | 10/1969 | Poschenrieder et al. ..... | 307/221X |
| 3,474,260 | 10/1969 | Frohbach .......... | 307/221 |

*Primary Examiner*—Donald D. Forrer
*Assistant Examiner*—R. C. Woodbridge
*Attorneys*—C. Cornell Remsen, Jr., Walter J. Baum, Percy P. Lantzy, J. Warren Whitesel, Delbert P. Warner and James B. Raden

ABSTRACT: An automatic equalization circuit, e.g. for telephone channels carrying high-speed data, of the kind using a lumped-constant delay line for temporary storage of channel signals, is simplified by substituting for the delay line a chain of capacitive storage elements linked by diode or FET gates.

DELAY LINE ARRANGEMENT

This invention relates to tapped delay line arrangements such as are used in transversal equalizers for data transmission over telephone channels.

The principal factor which limits the speed at which data can be transmitted over a telephone channel is the intersymbol interference that results from variation in the group delay and attenuation characteristics across the bandwidth which is used for transmission. It follows therefore that equalization is one of the most profitable ways of improving the performance of data transmission systems.

Much attention has been given in recent years to the problems of developing automatic equalization for data channels. Most of the work in this field is based on the use of transversed equalizers, which have the advantage that variation in the characteristics can be effected by merely varying a resistance, and that synthesis of a particular time response is a simple matter when the equalizer operation is viewed in the time domain.

One of the basic requirements for a transversed equalizer is that it has temporary storage to store the immediate past history of the data signal.

According to the invention there is provided a tapped delay line arrangement consisting of a number of pairs of identical storage sections connected in series, each section in a pair including a capacitor, means for isolating means operating in response to driving pulses in a driving clock pulse train, means for transferring a voltage stored on a capacitor in one section to the capacitor in the next section when the intervening isolating means is nonoperative, all the isolating means in the first section of each pair being responsive to the driving pulses of a first driving pulse train applied thereto and all the isolating means of the second sections of each pair being responsive to the driving pulses of a second similar driving pulse train applied thereto, the first and second driving pulse trains being 180° out of phase with one another.

In a preferred embodiment of the invention the voltage transfer means in each section includes a high input resistance voltage-follower circuit the input to which is the voltage on the capacitor immediately preceding that circuit which is isolated from the capacitors immediately preceding and succeeding it by the isolating means.

In one embodiment of the invention the isolating means in each section consists of a pair of diodes arranged in effective series opposition one on either side of the transfer means so that the diodes are blocked when the relevant pulses of the appropriate driving pulse train occur, each section also including means for resetting the capacitor to an initial condition equivalent to zero storage in response to resetting pulses in a reset pulse train, the resetting means in the first and second sections being responsive to reset pulses in similar first and second reset pulse trains respectively, the reset pulse trains being 180° out of phase with one another, the reset pulse trains having the same frequency as the driving pulse trains and having a predetermined phase relationship with the driving pulse trains whereby resetting of a capacitor takes place after transfer of the stored voltage to the next capacitor has occurred.

In an alternative embodiment the isolating means in each section consists of a junction field-effect transistor the source/drain path of which is interposed in between the transfer means of one section and the capacitor of the next succeeding section.

The above mentioned and other features of this invention and the manner of attaining them will become more apparent and the invention itself will be best understood by reference to the following description of two embodiments of the invention taken in conjunction with the accompanying drawings, wherein.

It is not necessary for the purposes of describing this invention to go deeply into the theory of the operation of a transversal equalizer, but sufficient explanation will be given to enable the temporary storage requirements to be appreciated.

Figure 1:
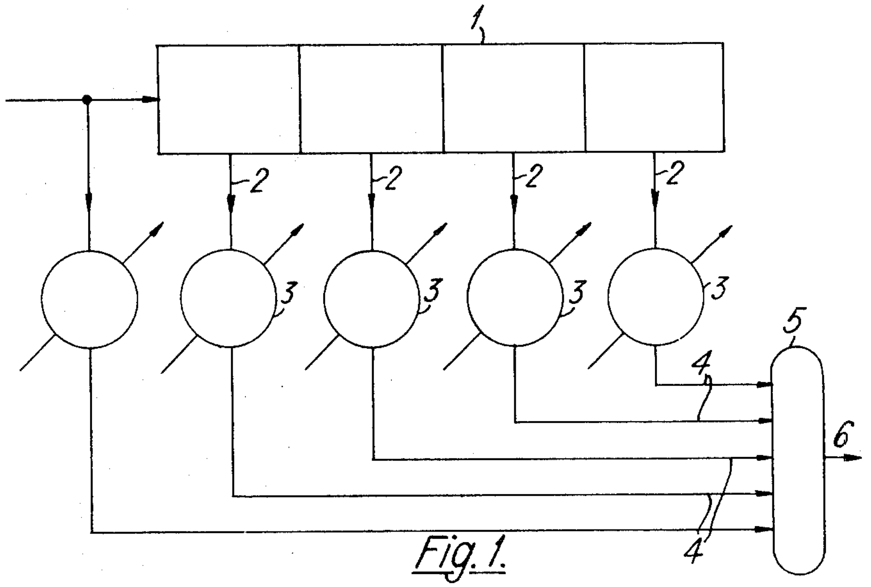
FIG. 1 is a block diagram illustrating the requirement of a transversal equalizer for a tapped delay line of the type described below.

A block diagram of the essential elements of a transversal equalizer is shown in FIG. 1. It consists of a tapped delay line 1. the outputs 2. of which drive a set of multipliers 3. which are capable of multiplying the tap outputs by some value which is usually in the range of ±1. The multiplier outputs 4. are summed in the network 5. to give the equalizer output 6. The equalizer is adjusted by setting the values of the multipliers to give an output that satisfies some selected criterion.

The tapped delay line provides the temporary storage for storing the immediate past history of the data signal.

Accurate retention of the stored information is not necessary provided that any distortion which does occur takes the form of magnitude attenuation or added intersymbol interference, because distortion of this nature (if it is not too severe) will obviously be removed by the equalization process.

Since the storage times which are required normally correspond to about 10—20 symbol periods, which for voice-band data transmission is roughly 5—10 msec., it is possible to use capacitive storage and store the data sequence in terms of its values at the sampling instant.

Figure 2:
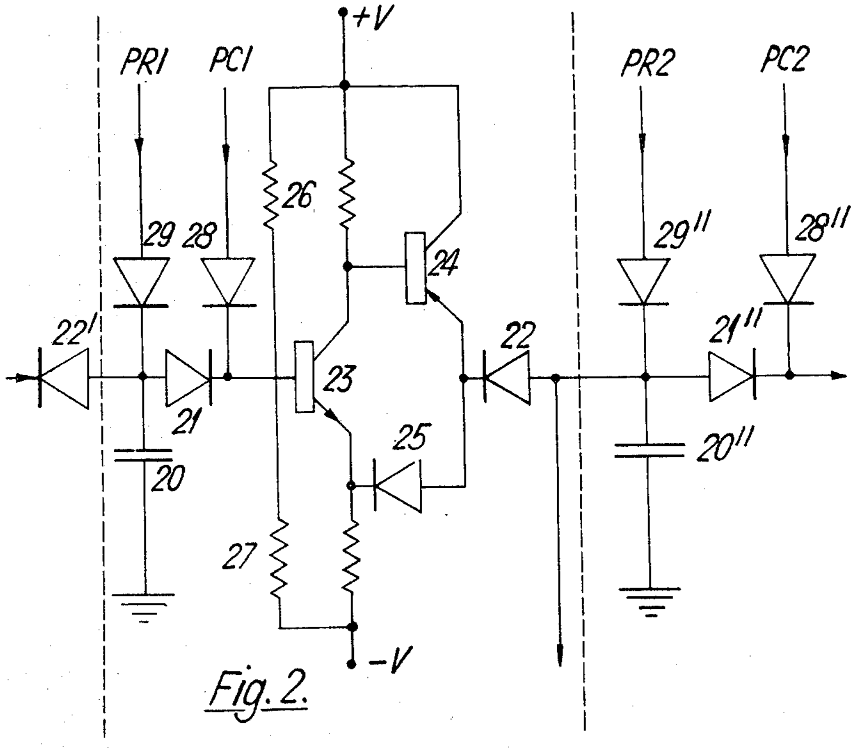
FIG. 2 is a circuit arrangement illustrating a section of a capacitive delay line using diode isolating means.

One circuit for the shift register type of delay line is shown in FIG. 2. It should be explained here that in fact the delay line requires two sections for each equivalent delay line tap—this is because of the time constants of the capacitive circuits. All the sections, however, are identical and so FIG. 2 shows only the whole of one section together with its interconnection with the immediately preceding and succeeding sections.

Each section has a capacitor 20, a transfer circuit and a pair of isolating diodes 21, 22. The transfer circuit is basically a high input resistance voltage-follower circuit consisting of of two transistors 23, 24, connected as shown. Diode 25 is used to offset the voltage between base and emitter of transistor 23.

Resistors 26 and 27 are chosen such that under quiescent conditions the base of the first transistor will closely approximate zero volts. Whilst this increases the loading on the storage capacitor 20, it tends to make any attenuation in the value of the stored information less dependent on its polarity. Diode 21 serves to protect the base-emitter junction of the first transistor from excessive reverse bias; its forward voltage drop is offset by diode 22.

The system operates with a two-phase clock and two-phase reset. The clock pulses PC1 applied to the base of transistor 23 via diode 28 and the reset pulses PR1 are applied to the capacitor 10 via diode 29.

The transfer circuit is connected to bias voltage supplies +V and −V.

The corresponding components of the adjacent sections, insofar as they are shown, are referenced 22′ and 20″, 21″, 28″ and 29″ respectively.

Figure 3:
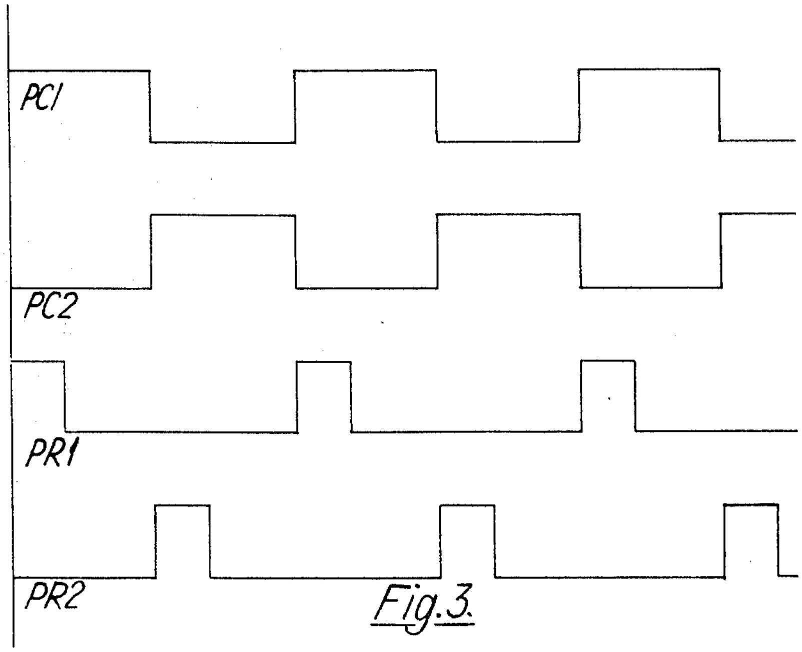
FIG. 3 is a timing diagram for driving and resetting pulses relating to FIG. 2.

The two phases of the clock pulses PC1 and PC2 are shown in FIG. 3; they are 180° out of phase with each other. The two phases of the resetting pulses PR1 and PR2 are also shown in FIG. 3. Again they are 180° out of phase with each other. As shown PR1 and PC1 go positive together, as do PR2 and PC2.

There are three steps in the operation of transferring information from one section to the next: reset, charge, hold. When a positive PC1 pulse is applied diodes 21 and 22 are reverse biased, thus isolating capacitor 20 from the base of transistor 23. This positive pulse PC1 corresponds to the reset and charge steps. A negative PC1 pulse corresponds to the hold step when the charge on the capacitor 20 is available for transfer through the unblocked diodes 22 and 23.

When diodes 22 and 23 are first blocked by a positive PC1 pulse, a positive PR1 pulse is applied to capacitor 20 via diode 29 and the capacitor is charged to its most positive value. After PR1 ceases the capacitor will discharge to the voltage at the output of the transfer circuit of the previous stage, diode 22' being unblocked. When PC1 goes negative and PC2 goes positive, diodes 22' and 22'' are blocked and diodes 21 and 22 are unblocked. The voltage on capacitor 20 is then applied to the base of transistor 23 and this voltage appears at the emitter of transfer transistor 24. Meanwhile capacitor 20'' has been charged to its most positive value by a PR2 pulse, following which it discharges to the voltage appearing at the emitter of transistor 24. This sequence of operations is repeated at each stage. An output is derived from alternate sections.

The circuit of FIG. 2 has limitations which are due firstly to differences between the forward voltage drops of the diodes 21, 22 and 25 and the base-emitter junction of the transistor 23 which will result in an error voltage being added to the stored quantities as they are shifted through the sections, giving an input output relationship of the form:

$$V_{out}=AHKV_{in}+\delta V$$

where $\delta V$ is the error voltage and $K$ is a constant.

The result of this will be to make the equalizer pattern sensitive as its effect will differ for positive and negative signals. The effect can clearly be minimized by making the input voltage swing as large as possible; ±20 volts is the sort of figure visualized as being usable with present transistors. It can also be minimized by designing the circuit to make positive and negative values of $\delta V$ equiprobable so that, on average, the effect is not cumulative. The second limitation is the reduction in the magnitude of the stored quantity due to the circuit possessing a finite time-constant; attenuation by factors of up to four or five will not be likely to cause any problems.

Figure 4:
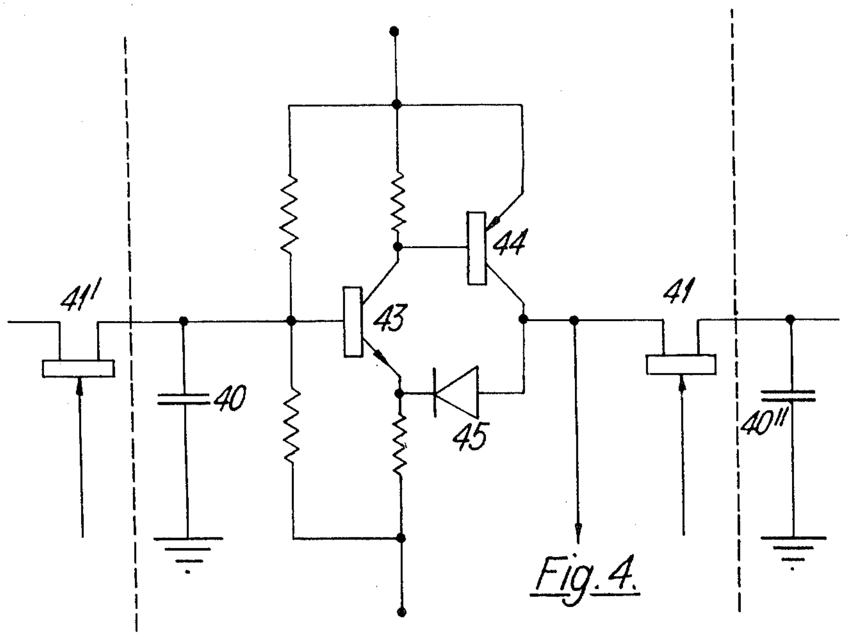
FIG. 4 is a circuit arrangement illustrating a section of a capacitive delay line using junction FET isolating means.

The availability of junction field effect transistors at a reasonable cost gives rise to the alternative circuit shown in FIG. 4. The principle is similar to that of FIG. 2 but the switching is performed by the field effect transistors 41, 41'. The transfer circuit, as before, comprises transistor 43, 44, diode 45 and biasing resistors. No reset and charge pulses PR are needed for this arrangement. When transistor 41 is off line response to the appropriate PC1 pulse the voltage on capacitor 40 is that of the output of the preceding transfer circuit, via 41' is off the voltage on 40 is transferred via 41 to 40''. Not only is the circuit of FIG. 4 simpler to construct and operate but also it has only two voltage drops per section compared with the four voltage drops of FIG. 2.

An advantage of a capacitive storage system over a conventional lumped constant delay line is that the time delay per stage is under control of a clock pulse and can therefore be easily varied to suit transmission at different symbol rates. It will also not add any intersymbol interference of its own as a lumped constant delay line will, due to nonlinearity in its characteristics.

It is to be understood that the foregoing description of specific examples of this invention is made by way of example only and is not to be considered as a limitation on its scope.

I claim:

1. A tapped delay line arrangement comprising a number of pairs of identical storage sections connected in series, each section in a pair including a capacitor, means for isolating that capacitor from the adjacent sections, the isolating means operating in response to driving pulses in a driving clock pulse train, means for transferring a voltage stored on a capacitor in one section to the capacitor in the next section when the intervening isolating means is nonoperative, the isolating means in the first section of each pair being responsive to the driving pulses of a first driving pulse train applied thereto and the isolating means of the second sections of each pair being responsive to the driving pulses of a second similar driving pulse train applied thereto, the first and second driving pulse trains being 180° out of phase with one another, wherein the voltage transfer means in each section includes a high input resistance voltage-follower circuit between successive stages comprising a pair of transistors, the input to which is the voltage on the capacitor immediately preceding that circuit which is isolated from the capacitors immediately preceding and succeeding it by the isolating means.

2. A tapped delay line arrangement as claimed in claim 1, wherein each section comprises a first and a second transistor of complementary symmetry, the base of the first transistor being connected to the capacitor immediately preceding the transfer means and being biased to approximately zero volts, the base of the second transistor being connected to the collector of the first transistor, the emitter of the second transistor being connected to the emitter of the first transistor and the emitter of the second transistor being connected, via an isolating means, to the capacitor immediately succeeding the transfer means.

3. A tapped delay line arrangement according to claim 2, wherein the isolating means in each section consists of a junction field-effect transistor the source/drain path of which is interposed in between the transfer means of one section and the capacitor of the next succeeding section.